United States Patent [19]

Lywood

[11] 4,152,128

[45] May 1, 1979

[54] ROTARY SEPARATOR

[76] Inventor: Jeremy H. G. Lywood, Davenport House, Worfield, Bridgnorth, Shropshire, England

[21] Appl. No.: 814,909

[22] Filed: Jul. 12, 1977

[30] Foreign Application Priority Data

Jul. 12, 1976 [NZ] New Zealand .................. 181439

[51] Int. Cl.² .............................................. B01D 45/08
[52] U.S. Cl. .................................. 55/400; 209/367
[58] Field of Search ............... 55/400, 437, 438, 469, 55/407; 209/270, 366.5, 367; 417/363; 210/363, 367, 380 H

[56] References Cited

U.S. PATENT DOCUMENTS

| 1,014,388 | 1/1912 | Gray | 209/366.5 |
|---|---|---|---|
| 2,653,521 | 9/1953 | Ahlfors | 209/270 |
| 2,755,016 | 7/1956 | Busch | 417/363 |
| 2,843,314 | 7/1958 | Hansen | 417/363 |
| 2,867,377 | 1/1959 | Lasko | 417/363 |
| 2,885,142 | 5/1959 | Eberhart | 417/363 |
| 3,185,099 | 5/1965 | Spring | 417/363 |
| 3,799,348 | 3/1974 | Mazza | 210/363 |
| 3,800,514 | 4/1974 | Avondoglio et al. | 55/400 |
| 3,857,687 | 12/1974 | Hamilton | 55/407 |

*Primary Examiner*—Frank W. Lutter
*Assistant Examiner*—David L. Lacey
*Attorney, Agent, or Firm*—Neil F. Markva

[57] ABSTRACT

A separator for separating solid particles from a gas stream in which they are entrained comprises a rotatable member on which the entrained particles impinge. The member rotates about a non-vertical axis. The rotatable member is mounted on a stationary body of the separator through the intermediary of resiliently deformable mounting elements which reduce the risk of excessive vibration occurring in consequence of the presence of an unbalanced mass on the rotatable member.

4 Claims, 1 Drawing Figure

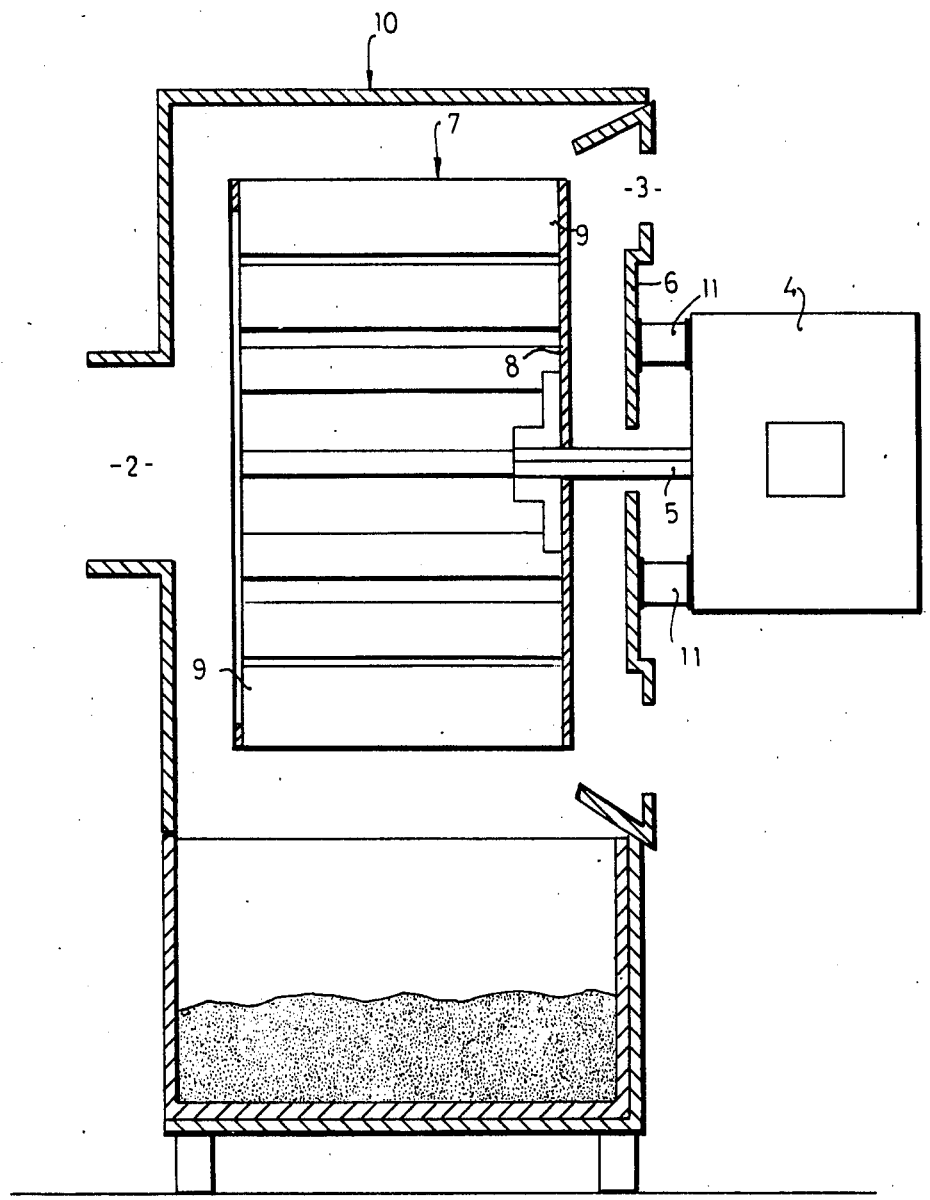

ROTARY SEPARATOR

BACKGROUND TO THE INVENTION

This invention relates to a separator for separating solid particles from a gas stream in which the particles are entrained. The separator comprises a rotatable member on which the entrained particles impinge during operation and the axis of rotation of the member being non-vertical. The rotatable member may be an impeller which impels the gas stream through the separator. Additionally or alternatively, the rotatable member may be arranged for separating the particles by causing impaction of the particles on the rotatable member.

Particularly in a case where the rotatable member itself separates the particles from the gas stream by impaction of the particles on the rotatable member, but also in other cases where the rotatable member is contacted by the gas stream carrying particles, the separated matter can accumulate on the rotatable member. If such accumulation is not distributed symmetrically around the axis of rotation and longitudinally of the axis, then the accumulation will result in the presence of an out-of-balance mass on the rotatable member. The presence of such an out-of-balance mass tends to cause the member to vibrate as it is rotated and such vibration causes excessive wear and excessive emission of noise. Accordingly, when solid matter accumulates on the rotatable member of apparatus of the kind specified, it is necessary either to clean the member or to replace it.

SUMMARY OF THE INVENTION

It is an object of the present invention to increase the tolerance of the separator to the presence of an out-of-balance mass on the rotatable member and thereby reduce the necessity for cleaning or replacement of the rotatable member frequently.

According to the invention, the rotatable member is mounted on a body of the apparatus through the intermediary of one or more resiliently deformable mounting elements.

The provision of resiliently deformable mounting elements for the rotatable member enables use of the apparatus to be continued even when there is a considerable and uneven accumulation of solid matter on the rotatable member.

BRIEF DESCRIPTION OF THE DRAWING

The accompanying drawing shows, partly in side elevation and partly in cross section, one example of a separator in accordance with the invention.

DESCRIPTION OF THE PREFERRED EMBODIMENT

The separator shown in the accompanying drawing comprises a body or casing 10 having, at one end, a circular inlet opening 2 to receive dust-laden air and, at the opposite end, an annular outlet opening 3 through which clean air is discharged.

Electric motor 4 is disposed outside casing 10 and has a drive shaft 5 which extends through an opening in a rear wall 6 of casing 10. Drive shaft 5 is coaxial with the outlet opening 3. A rotatable member or impaction-type impeller 7 is mounted on drive shaft 5 within casing 10. Impeller 7 has an imperforate end wall 8 which is perpendicular to drive shaft 5. A plurality of vanes 9 are arranged around the periphery of end wall 8 and project therefrom toward a front wall of casing 10 in which inlet opening 2 is formed. The outer end or front wall of impeller 7 adjacent to inlet opening 2 is open.

The axis of drive shaft 5 corresponds to the axis of rotation of impeller 7 and is non-vertical. In the particular example shown, the axis is horizontal.

Four mounting elements 11 secure impeller 7 and motor 4 to casing 10 in the example illustrated. Mounting elements 11 are spaced equally from the axis of drive shaft 5 and are spaced equally from each other around this axis.

Typically, mounting elements 11 are each formed of an elastomeric material having a Shore hardness of 50. Each mounting element 11 has a diameter of 30 mm. and a length of 22.2 mm. One end of each mounting element 11 is secured to casing 10 and the other end is secured to motor 4. Each mounting element 11 has a character such that a compressive load of 15 kgm. produces a deflection of 0.6 mm. and a shear load of 15 kgm. produces a deflection of 3.8 mm. The character of mounting elements 11 is selected to so limit displacement of the impeller 7 relative to casing 10 throughout the speed range from zero to the maximum speed at which impeller 7 can be rotated such that there is no risk of impeller 7 coming into contact with casing 10.

In the example shown, impeller 7 has an external diameter of 400 mm. and a weight of 7 kgm. Satisfactory damping of oscillation of impeller 7 and motor 4 with an unbalanced mass of 100 grams at the periphery of impeller 7 is provided by the mounting elements 11 with rotation of impeller 7 at speeds near to or within the range 2850 to 3420 r.p.m. In the example shown, the mass of the parts which are supported by mounting elements 11 on one side of the plane extending through the respective centers of mounting elements 11 is related to the mass of the parts which is supported by mounting elements 11 on the other side of the plane by the ratio 1 to 0.375. This mass distribution produces a further imbalance along the axis of rotation. The larger mass is constituted by motor 4 having a weight of 17 kgm., as compared with the 7 kgm. of impeller 7. The maximum lateral displacement of the axis of rotation of impeller 7 at the open end thereof is 50 mm. This open end of impeller 7 is spaced a distance of 350 mm. from the plane which contains the respective centers of mounting elements 11.

By way of comparison, if impeller 7 and motor 4 are mounted rigidly on casing 10, an unbalanced mass of 1 gram at the periphery of an impeller having a diameter of approximately 400 mm. and a weight of 7 kgm. will cause serious vibration at the speed of 3000 r.p.m.

Although the resilient mounting elements 11 are not intended to damp vibration caused by large unbalanced masses, it can be seen that the resilient mounting elements 11 enable the apparatus to tolerate unbalanced masses approximately 100 times greater than can be tolerated in similar apparatus where rigid mounting elements are used.

I claim:

1. A separator for separating solid particles from a gas stream in which the particles are entrained, said separator comprising:
   (a) a stationary hollow body having a gas inlet and a gas outlet,
   (b) a rotatable separating means disposed in said body to intercept the entrained particles in said gas stream which flows from said gas inlet to said gas outlet, (c) a motor having a drive shaft which is rotatable relative to the body about a non-vertical axis, the rotatable separating means being secured on the drive shaft for rotation therewith about said axis, and (d) at least one mounting element secured to the body and secured to the motor for supporting the motor and said member on the body, (e) said at least one mounting element being resiliently deformable, such that said axis can oscillate in response to rotation of an unbalanced mass on said separating means without causing a substantial vibration of the body and to also prevent said separating means from hitting the inside of said body.

2. A separator according to claim 1 wherein
said at least one mounting element is offset from the vertical plane containing the center of gravity of those parts of the separator which are supported by the mounting element.

3. A separator according to claim 1 wherein
there are a plurality of said mounting elements spaced apart equally around an axis of rotation of the rotatable member.

4. A separator according to claim 1 wherein
the mass of the motor exceeds the mass of the rotatable member,
said body includes a wall which is formed with an aperture,
the wall lies between the motor and said member,
the shaft extends through the aperture,
the motor has an end adjacent to the wall,
said at least one mounting element is secured to the wall and to said end of the motor, and
said at least one mounting element lies between the wall and the motor.

* * * * *